Figure 1:
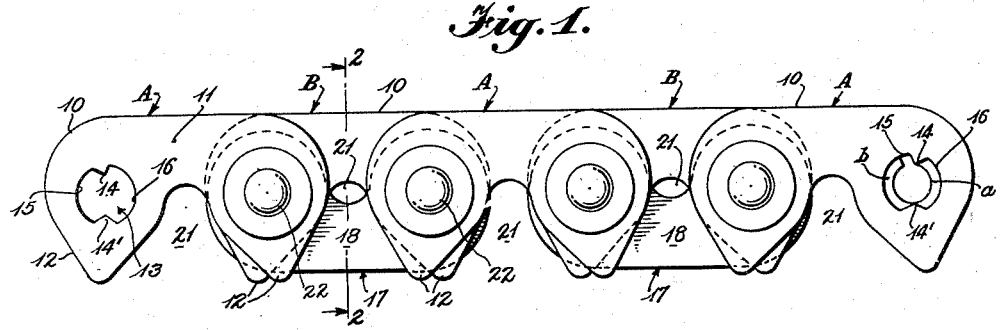

Oct. 10, 1950     H. S. PIERCE     2,525,561

DRIVE CHAIN

Filed Sept. 5, 1946

Inventor

Harold S. Pierce

By L. Donald Myers

Attorney

Patented Oct. 10, 1950

2,525,561

UNITED STATES PATENT OFFICE 2,525,561

DRIVE CHAIN

Harold S. Pierce, Indianapolis, Ind., assignor to Link-Belt Company, a corporation of Illinois Application September 5, 1946, Serial No. 694,874

6 Claims. (Cl. 74—251)

This invention relates to new and useful improvements in drive chains of the silent type, and deals more particularly with the feature of guiding and holding such chains centrally on their wheels.

It is the conventional practice to incorporate guide links in silent chain assemblies for the purpose of maintaining the chains centered on their wheels or sprockets. These guide links may be assembled in one or more rows extending longitudinally of the chain and between the side margins or edges thereof, or they may be assembled in longitudinal rows at the two side margins or edges of the chain. When the row or rows of guide links are located between the sides of the chain, the teeth of the associated wheels are interrupted to accommodate the guide links. Regardless of where the row or rows of guide links are located with reference to the width of their chain, the guide links perform their intended function by engaging the ends of associated wheel teeth. Consequently, the guide links must be so constructed that they span or extend through the archways or valleys formed between adjacent transverse rows of chain teeth. To provide this required structural feature, it has been the practice to form the guide links as substantially rectangular solid plates, which differ in side elevation from the conventional toothed links by being continuous or solid where the toothed links are arched or cut away.

For any drive chain to afford the greatest tensile and fatigue strength possible, it must provide uniform load distribution throughout the entire width of each pitch; i. e., each unit link of any given pitch must take its proportionate share of the total load applied to that pitch. This action is not possible unless all of the unit links of each pitch have the same elastic properties and will provide the same pitchwise elongation or distortion under load.

It will be appreciated that the standard or driving links used in silent chains are generally of an arch form with the standing parts shaped to form the spaced drive teeth that transmit the power as a result of meshing with the teeth of the wheels. The load is applied through the chain pins positioned in the pitch holes which are located in the toothed portions of the links. Because of this link design and method of loading any given load produces a relatively large pitchwise elongation in the standard or drive links. The solid or continuous design of the conventional guide links, on the other hand, prevents these links from having the same elastic properties as the standard or drive links because they are much more rigid. Consequently, their pitchwise elongation or deflection is much less than that of the drive links for any given load condition.

The greater rigidity or resistance to flexure of the conventional, solid guide links not only causes these links to assume more than their proportionate share of the load, but it determines the share of the load that is assumed by the remaining drive links of the pitch. That is, the drive links closest to the guide links are prevented from taking their proportionate share of the load while the drive links farthest from the guide links are required to take more than their proportionate share. This uneven distribution of load causes the chain pins to bend and the chain pitch across a pitch to be distorted. Proof of this condition is established by the fact that failure of a chain pitch always originates in the drive links that are farthest away from the guide links.

It has been established by tests that a silent chain, of a given size, having a centrally located row of conventional solid guide links, has an actual breaking strength of only 85.9% of the theoretical while a silent chain of the same size, having two rows of conventional guide links arranged either between or at both side margins of the chain, has an actual breaking strength of only 83.9% of the theoretical.

It is the primary object of this invention to provide silent drive chains, having one or more rows of guide links arranged either intermediate or at the side margins thereof, which provide uniform load distribution throughout the width of each pitch.

A further important object of the invention is to provide guide links for silent chains, which are adapted to be arranged in one or more rows at any desired crosswise location or locations and to effect the desired guiding action by engaging the ends of associated wheel teeth which will have the same elastic properties as the standard or drive links and, consequently, will provide uniform pitchwise elongation or deflection and uniform load distribution throughout each pitch.

Other objects and advantages of the invention will be apparent during the course of the following description.

Figure 2:
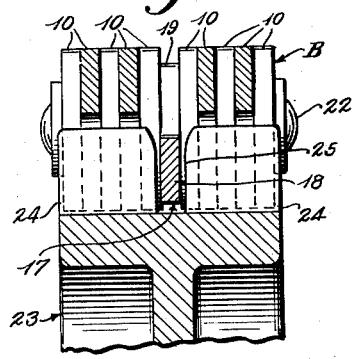
Figure 3:
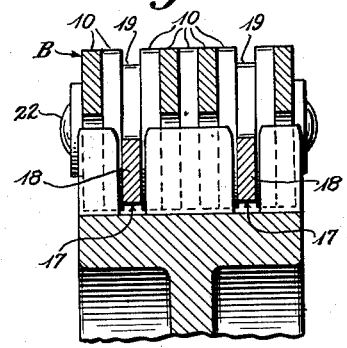
Figure 4:
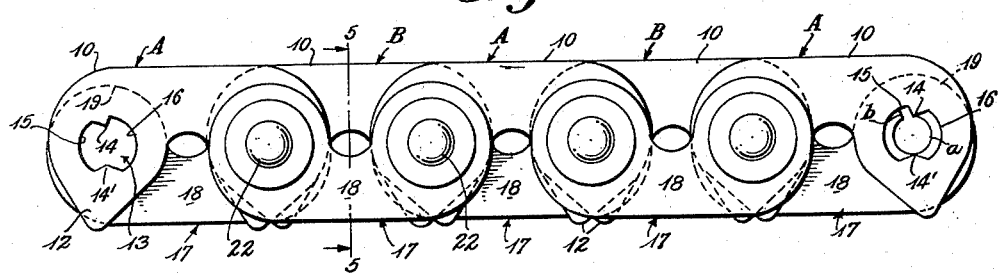
Figure 5:
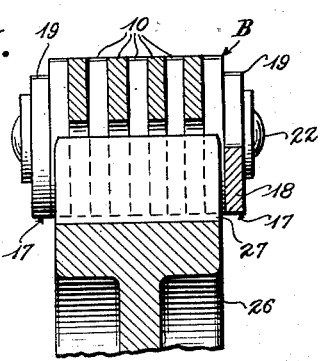
Figure 6:
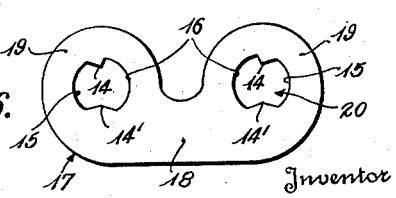

In the accompanying drawing forming a part of this specification and in which like numerals are employed to designate like parts throughout the same, Figure 1 is a side elevational view of a section of silent drive chain showing one row of guide links embodying this invention centrally incorporated in alternate pitches of the chain, Figure 2 is a transverse section taken on line 2—2 of Fig. 1, Figure 3 is a similar view of Fig. 2 but illustrates the modification of providing two rows of guide links that are spaced relative to each other transversely of the chain and are located intermediate the side margins or edges of the chain, Figure 4 is a similar view to Fig. 1 but illustrates the further modification of locating two rows of guide links at the opposite side margins or edges of the chain, Figure 5 is a transverse sectional view taken on line 5—5 of Fig. 4, and Figure 6 is a detail elevational view of one of the guide links that is shown in the previous figures as being assembled in one or more rows in the drive chains.

In the drawing, wherein for the purpose of illustration are shown the preferred embodiments of this invention, and first particularly referring to Figs. 1 and 2, there is illustrated a section of silent drive chain that includes the alternate pitches A and B. Each one of the pitches A is made up of a suitable number of drive links 10. Each one of these drive links is of arched form for providing a back part 11 and two spaced standing parts 12 that are shaped to provide drive teeth. Formed in each of the two standing, or tooth shaped parts of each link are the pitch holes 13. These pitch holes are shaped in the conventional manner to provide projections 14 and 14'. These projections are so arranged that they form a portion 15 for receiving without relative movement the joint liner $a$ for the particular link being considered and a longer or larger portion 16 that accommodates with relative movement the liner $b$ of the next adjacent or overlapping pitch. It will be noted that the projections 14 and 14' are of different shape in elevation. The projections 14' are shaped and arranged so as to permit joint action of adjacent pitches in the proper direction to allow the chain to wrap around sprockets but to prevent joint action, or back bending, in the opposite direction.

Each one of the pitches B is provided with an appropriate number of drive links 10. Each one of these links is of identical construction to the links that form the next adjacent pitches A. These links 10 for the pitches B, therefore, will not be described in detail. The pitches B of the chain differ from the pitches A in that each one of the pitches B is provided with a guide link 17. These guide links are arranged in a single longitudinal row that is located centrally of the two side margins or edges of the chain.

Fig. 6 illustrates in elevation an appropriate shape or design of one of the guide links 17. This guide link is of arch form to provide the back part 18 and the two standing parts 19. These standing parts are not shaped to form drive teeth like the standing parts 12 of the drive links 10. The standing parts 19 are of circular contour or peripheral shape throughout their free edges. Each standing part 19 is formed with a pitch hole 20 that is of identical shape to the pitch holes 13 of the drive links 10. That is to say, they are provided with projections 14 and 14' that define the portions 15 and 16 which accommodate the joint liners $a$ and $b$ and permit joint action in one direction only.

By inspecting Figs. 1 and 2, it will be seen that the drive links 10 of all of the pitches A and B are assembled so as to have their drive teeth parts 12 in one face of the chain which causes their back parts 11 to form the other face of the chain. When thus assembled, each pitch is provided with a sprocket wheel tooth receiving archway or valley 21. The guide links 17, however, are reversely assembled in the pitches of the chain. That is to say, the back parts 18 of the guide links are arranged in the same face of the chain as the tooth shaped standing parts of the drive links 10. This causes the back parts 18 of the guide links to span or extend through the archways or valleys 21 of the pitches B in which the guide links are assembled. Conventional chain pins 22 form articulating joints between adjacent pitches.

By considering Fig. 2, it will be seen that the sprocket wheel 23, that is intended to accommodate the drive chain of Fig. 1, has its teeth divided into the two parts 24 that are spaced to provide the openings 25 that accommodate the back parts 18 of the guide links 17.

Fig. 3 merely discloses a silent drive chain of the type illustrated in Figs. 1 and 2 but in which two longitudinal rows of guide links 17 are provided. In all other respects, this chain of Fig. 3 is the same as the chain of Figs. 1 and 2 and for that reason no detailed description will be presented. The same reference characters will be applied to like elements in this figure.

Figs. 4 and 5 illustrate the same type of silent drive chain shown in the preceding figures but differs therefrom by having two rows of guide links 17 with one of said links positioned in each pitch and with the links positioned in adjacent pitches being arranged at the opposite side margins or edges of the chain. Consequently, the sprocket wheel 26 is formed with teeth 27 that are continuous throughout the entire width of the wheel. The same reference characters will be applied to corresponding elements in the disclosure provided by Figs. 4 and 5.

It will be seen, by employing guide links of the type illustrated in detail in Fig. 6 that these guide links will possess the same elastic properties as the drive links 10 that are assembled in the same pitches. Consequently, the pitches that are provided with either one or two guide links 17 will have uniform pitchwise elongation or deflection and uniform load distribution. That is to say, each one of the guide links 17 will elongate to the same extent as each one of the drive links 10 with the result that all of the links of both types will assume their equal and proportionate share of any given load that is applied to a chain equipped with these guide links.

It has been noted above that silent chains, of a given size, having centrally located rows of conventional solid guide links, have an actual breaking strength of only 85.9% of the theoretical. It has been established by tests that the same size silent chain equipped with a centrally located row of the improved type of guide links embodying this invention has an actual breaking strength of about 97%. It, also, was pointed out above that the use of two rows of conventional solid guide links arranged between or at the side margins of a silent chain, of the aforesaid given size, has an actual breaking strength of only 83.9% of the theoretical. This same chain with the improved form of guide links substituted for the conventional form of guide links has an actual breaking strength of 97.9% of the theoretical. It will be appreciated, therefore, that the use of guide links that possess the same elastic qualities as the drive links of a chain definitely results in increasing both the tensile and fatigue strength of said chain.

It is to be understood that the forms of this invention herewith shown and described are to be taken as preferred examples of the same, and that various changes in the shape, size, and ar-

Having thus described the invention, I claim:

1. In a drive chain, a plurality of pitches of flat links having their adjacent end portions overlapped and in full face contact with each other, and articulating joint parts connecting said overlapped ends, all of the links of all of the pitches being so shaped in side elevation and dimensioned in cross-section as to have the same elastic properties and to provide the same pitchwise elongation or distortion, certain of the links of the pitches being of identical construction and being arched to provide standing parts, which are shaped to form drive teeth, and back parts connecting the standing parts, all of said certain links being assembled with their drive teeth arranged in transverse rows at the same face of the chain, the remaining links functioning solely as guide links and having parts arranged to span the archways formed between the transverse rows of drive teeth of the pitches in which they are assembled.

2. In a drive chain, a plurality of pitches of flat links all of which have their adjacent end portions overlapped and in full face contact with each other, and articulating joint parts connecting all of said overlapped link ends, said joint parts being constructed to permit bending of all of the links of the chain in only one direction for cooperating with sprocket wheels, all of the links of all of the pitches being so shaped in side elevation and dimensioned in cross-section as to have the same elastic properties and to provide the same pitchwise elongation or distortion, certain of the links of the pitches being of identical construction and being arched to provide standing parts, which are shaped to form drive teeth, and back parts connecting the standing parts, all of said certain links being assembled with their drive teeth arranged in transverse rows at the same face of the chain, the remaining links functioning solely as guide links and having parts arranged to span the archways formed between the transverse rows of drive teeth of the pitches in which they are assembled.

3. In a drive chain, a plurality of pitches of flat links having their adjacent end portions overlapped and in full face contact with each other, and articulating joint parts connecting said overlapped ends, each articulating joint comprising a pair of opposed liners extending the full length of the joint, a pin rotatably positioned between said liners, and pitch holes formed in the overlapped ends of the links so shaped as to hold one of said liners against angular movement relative thereto while permitting limited relative angular movement of the other liner relative thereto, all of the links of all of the pitches being so shaped in side elevation and dimensioned in cross-section as to have the same elastic properties and to provide the same pitchwise elongation or distortion, all of the links of alternate pitches and certain of the links of the remaining pitches being arched to provide standing parts, which are shaped to form drive teeth, and back parts connecting the standing parts, all of the links of the alternate pitches and all of the said certain links of the remaining pitches being assembled with their drive teeth arranged in transverse rows at the same face of the chain, the remaining links functioning solely as guide links and having parts arranged to span the archways formed between the transverse rows of drive teeth of the pitches in which they are assembled.

4. In a drive chain, a plurality of pitches of flat links all of which are of uniform thickness throughout their lengths and have their adjacent end portions overlapped in full face contact with each other, and articulating joint parts connecting all of said overlapped link ends, said joint parts being constructed to permit bending of all of the links of the chain in only one direction for cooperating with sprocket wheels, all of the links of all of the pitches being so shaped in side elevation and dimensioned in cross-section as to have the same elastic properties and to provide the same pitchwise elongation or distortion, all of the links of alternate pitches and certain of the links of the remaining pitches being of identical construction and being arched to provide standing parts, which are shaped to form drive teeth, and back parts connecting the standing parts, all of the links having drive teeth being assembled with their teeth arranged in transverse rows at the same face of the chain, the remaining links functioning solely as guide links and having parts arranged to span the archways formed between the transverse rows of drive teeth of the pitches in which they are assembled.

5. In a drive chain of the silent type, the combination with a series of articulated pitches each of which has a plurality of flat driving links of identical construction that are arched to provide standing parts, shaped to form drive teeth, and back parts connecting the standing parts, of a series of guide links assembled in a longitudinal row in the articulated pitches and being so shaped in side elevation and dimensioned in cross-section as to have the same elastic properties and to provide the same pitchwise elongation or distortion as the drive links, each one of the guide links being arched to form a back part and two substantially circular standing parts, the driving links and the guide links being arranged in the pitches with their back parts on opposite faces of the chain.

6. In a drive chain of the silent type, the improvement which comprises a chain pitch having a plurality of flat driving links of identical construction that are arched to provide standing parts, shaped to form drive teeth, and back parts connecting the standing parts, and a guide link arched to form a back part and two substantially circular standing parts, the drive links and the guide link being arranged in the pitches with their back parts on opposite faces of the chain and being so shaped in side elevation and dimensioned in cross-section as to have the same elastic properties and to provide the same pitchwise elongation or distortion.

HAROLD S. PIERCE.

REFERENCES CITED

The following references are of record in the file of this patent:

UNITED STATES PATENTS

| Number | Name | Date |
|---|---|---|
| 1,598,906 | Dull | Sept. 7, 1926 |
| 1,860,514 | Stiansen | May 31, 1932 |
| 2,030,829 | Belcher | Feb. 11, 1936 |
| 2,036,216 | Johnson | Apr. 7, 1936 |